US009824306B2

(12) United States Patent
Kitora

(10) Patent No.: US 9,824,306 B2
(45) Date of Patent: Nov. 21, 2017

(54) IMAGE FORMING APPARATUS, CONTROL METHOD OF THE SAME, AND STORAGE MEDIUM

(71) Applicant: CANON KABUSHIKI KAISHA, Tokyo (JP)

(72) Inventor: Masakazu Kitora, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/642,508

(22) Filed: Mar. 9, 2015

(65) Prior Publication Data

US 2015/0262050 A1    Sep. 17, 2015

(30) Foreign Application Priority Data

Mar. 11, 2014    (JP) ................................ 2014-047164

(51) Int. Cl.
*G06K 15/02*    (2006.01)
*G06F 3/12*    (2006.01)
*G06F 1/26*    (2006.01)
*G06F 1/32*    (2006.01)
*G06K 15/00*    (2006.01)

(52) U.S. Cl.
CPC ................................ *G06K 15/4055* (2013.01)

(58) Field of Classification Search
None
See application file for complete search history.

(56) References Cited

U.S. PATENT DOCUMENTS

| 8,081,894 B2* | 12/2011 | Ashikawa | G03G 15/2039 399/67 |
| 2004/0146313 A1* | 7/2004 | Uchizono | G03G 15/5004 399/75 |
| 2004/0227970 A1* | 11/2004 | Ohara | B41J 29/38 358/1.13 |
| 2005/0211692 A1* | 9/2005 | Maitani | G03G 15/5004 219/216 |
| 2006/0028903 A1* | 2/2006 | Hada | H04N 1/00896 365/232 |
| 2006/0100724 A1* | 5/2006 | Miura | H04N 1/00209 700/82 |
| 2007/0014586 A1* | 1/2007 | Kobayashi | G03G 15/5004 399/70 |

(Continued)

FOREIGN PATENT DOCUMENTS

JP    2007296723 A    11/2007

*Primary Examiner* — Beniyam Menberu
(74) *Attorney, Agent, or Firm* — Canon U.S.A., Inc. IP Division

(57) ABSTRACT

An image forming apparatus operable in a first power state and a second power state in which power consumption is lower than in the first power state includes a return notification unit that outputs a return notification aggregating return factors in a case where at least one of a plurality of predetermined return factors causing the image forming apparatus to return to the first power state from the second power state has occurred in the second power state, a retaining unit that retains a return factor, and a control unit that returns the image forming apparatus to the first power state from the second power state according to the return notification and acquires the return factor retained by the retaining unit.

20 Claims, 5 Drawing Sheets

(56) References Cited

U.S. PATENT DOCUMENTS

| | | | | |
|---|---|---|---|---|
| 2007/0260358 | A1* | 11/2007 | Katoh | B41J 29/393 700/286 |
| 2008/0229132 | A1* | 9/2008 | Suga | B41J 29/38 713/324 |
| 2010/0083020 | A1* | 4/2010 | Suzuki | G06F 1/3209 713/322 |
| 2010/0257386 | A1* | 10/2010 | Hanada | H04B 3/54 713/310 |
| 2011/0080605 | A1* | 4/2011 | Wakamiya | G03G 15/5004 358/1.13 |
| 2011/0311237 | A1* | 12/2011 | Hotogi | G03G 15/80 399/9 |
| 2012/0229840 | A1* | 9/2012 | Fukada | G06F 1/3209 358/1.14 |
| 2013/0215481 | A1* | 8/2013 | Hayasaka | G03G 15/607 358/498 |
| 2014/0063528 | A1* | 3/2014 | Hirose | H04N 1/00323 358/1.13 |
| 2014/0115355 | A1* | 4/2014 | Chen | G06F 1/266 713/310 |
| 2014/0164805 | A1* | 6/2014 | Hasui | G06F 1/3253 713/323 |
| 2015/0043024 | A1* | 2/2015 | Hiramatsu | H04N 1/00891 358/1.14 |

* cited by examiner

FIG. 3

| | | |
|---|---|---|
| 301 | FACTOR 1 | OPERATION KEY IS PRESSED |
| 302 | FACTOR 2 | RECEIVE DATA FROM EXTERNAL I/F UNIT |
| 303 | FACTOR 3 | DETECT SHEET ON MANUAL SHEET FEEDING CASSETTE |
| 304 | FACTOR 4 | DETECT OPENING OF FRONT DOOR |

IMAGE FORMING APPARATUS, CONTROL METHOD OF THE SAME, AND STORAGE MEDIUM

BACKGROUND

Field

Aspects of the present invention generally relate to power control of an image forming apparatus.

Description of the Related Art

In recent years, with increasing demands for power saving and environmental awareness with respect to an image forming apparatus such as a multifunction peripheral (MFP), it has been necessary to provide a power control method capable of shifting the image forming apparatus to a sleep state (power saving state) as often as possible in order to reduce the standby power.

Japanese Patent Application Laid-Open No. 2007-296723 discusses an apparatus which returns from a sleep state by outputting an individual interrupt signal for each return factor which occurs at an input-output (I/O) controller. According to the configuration discussed in Japanese Patent Application Laid-Open No. 2007-296723, the individual interrupt signal is transmitted to the main controller for each return factor.

On the other hand, it is necessary to maintain operability of the MFP while realizing a comfortable operation environment which does not cause a user to notice that the MFP has returned from the sleep state, where possible. However, in a case where the MFP returns from the sleep state in response to a return factor from a main unit of the MFP, the number of signals transmitted via an interface (I/F) is increased if an individual interrupt signal is returned to the controller for each return factor according to the conventional technique. Therefore, it is necessary to perform control so that the controller and the main unit of the MFP can share the return factor while minimizing the number of signals transmitted via the I/F.

SUMMARY

Aspects of the present invention are generally directed to a system capable of reducing the number of signals communicated via an interface between a main unit of an image forming apparatus and a controller while realizing a comfortable operational environment which does not cause a user to notice that the image forming apparatus has returned from a power saving state.

According to an aspect of the present invention, an image forming apparatus operating in a first power state and a second power state in which power consumption is lower than in the first power state includes a return notification unit configured to output a return notification aggregating return factors that have occurred in a case where at least any of a plurality of predetermined return factors causing the image forming apparatus to return to the first power state from the second power state has occurred in the second power state, a retaining unit configured to retain each occurring return factor, and a control unit configured to return the image forming apparatus to the first power state from the second power state according to the return notification and acquire the return factor retained by the retaining unit.

Further features of the present disclosure will become apparent from the following description of exemplary embodiments with reference to the attached drawings.

BRIEF DESCRIPTION OF THE DRAWINGS

FIG. 3 is a table illustrating return factors of the image forming apparatus according to the exemplary embodiment.

DESCRIPTION OF THE EMBODIMENTS

Figure 1:
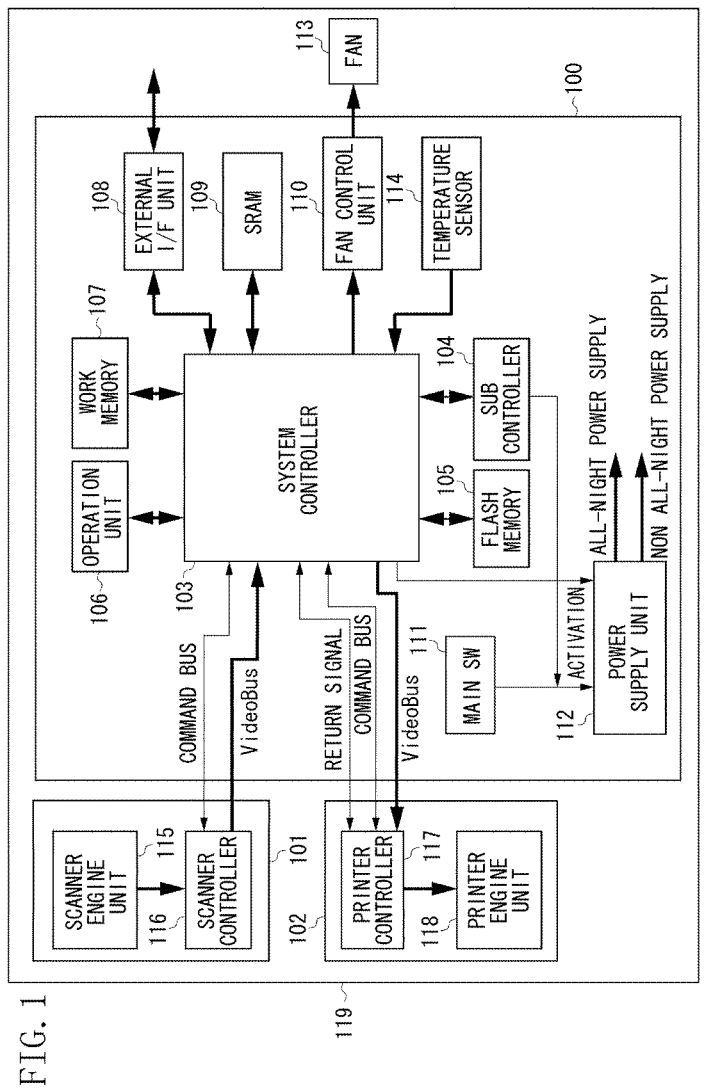
FIG. 1 is a block diagram illustrating an image forming apparatus according to an exemplary embodiment.

An exemplary embodiment will be described below with reference to the appended drawings. FIG. 1 is a block diagram illustrating an image forming apparatus according to an exemplary embodiment. In FIG. 1, the image forming apparatus (multifunction peripheral (MFP)) 119 according to the present exemplary embodiment includes a control unit 100, a scanner unit 101, and a printer unit 102. The control unit 100 controls the entire MFP 119. The scanner unit 101 reads image data from a document. The printer unit 102 records image data processed and output by the control unit 100 onto a recording medium (sheet). The internal configurations of individual units will be described below.

First, the internal configuration of the control unit 100 will be described. The control unit 100 includes a system controller 103 for processing image data. The system controller 103 is connected to below-described constituent elements through a general-purpose interface (I/F) or a unique I/F. The system controller 103 may be a general-purpose central processing unit (CPU) or a system-on-chip (SOC) such as an application specific integrated circuit (ASIC). Further, the system controller 103 may be a chipset combining the functions of, for example, an input-output (I/O) unit and an arithmetic processing unit.

A sub controller 104 controls the image processing executed by the MFP 119. As with the case of the system controller 103, the sub controller 104 is not limited to a specific configuration, but can take various forms according to a configuration required for the system. Further, a user program is stored in a flash memory 105.

An operation unit 106 receives an operation request from a user, and displays a state and information about the MFP 119 for the user. A work memory 107 serves as a work region of the system controller 103, and stores image data temporarily. An external I/F unit 108 connects to a network environment such as a local area network (LAN) which is a general-purpose I/F. When connected to the network environment, the external I/F 108 executes data transmission/reception (e.g., transmission of scanned image data and reception of print image data or image data of a web-browser) to/from the MFP 119 in the network environment.

A static random access memory (SRAM) 109 is provided with a backup battery such that the information such as address information of external devices or counter information which are necessary for the control unit 100 is stored therein even if the power supply unit 112 is in an off state. The system controller 103 controls a fan control unit 110 to electrically control rotation/suspension of a fan 113 and a volume of air blown from the fan 113. The system controller 103 detects a temperature of the MFP 119 through a temperature sensor 114.

A main switch (main SW) 111 functions as a switch for controlling on/off of the power source of the system. An output signal of the main SW 111 is input to the power supply unit 112. The power supply unit 112 supplies all-night power supply and non all-night power supply to the control unit 100 according to the output signal from the main SW 111.

Next, an internal configuration of the scanner unit 101 will be described. The scanner unit 101 includes a scanner engine unit 115 and a scanner controller 116. The scanner engine unit 115 reads a document and generates image data converted into an electric signal. The scanner controller 116 is connected to the system controller 103 in the control unit 100 via a video bus and a command bus which are unique interfaces, so as to transmit image data and transmit/receive a command to/from the system controller 103.

An internal configuration of the printer unit 102 will be described. The printer unit 102 includes a printer controller 117 and a printer engine unit 118. The printer controller 117 is connected to the system controller 103 in the control unit 100 via a video bus and a command bus which are unique interfaces, so as to receive image data and transmit/receive a command to/from the system controller 103. Further, according to the state of the printer engine unit 118, the printer controller 117 issues a return request to the system controller 103 by using a return signal (return notification). The printer engine unit 118 stores image data that is transmitted from the control unit 100 to the printer controller 117, in a storage medium.

With the above-described configuration, the MFP 119 can realize various kinds of image processing. A copy operation will be briefly described below as an example of the image processing. When the MFP 119 starts the copy operation, the scanner unit 101 electrically reads a document placed on a document positioning plate (not illustrated) provided on the scanner engine unit 115 and outputs the image data to the scanner controller 116. The scanner controller 116 executes analog-to-digital (A/D) conversion and correction processing on the received image data and transmits the image data to the system controller 103 of the control unit 100 via the video bus.

The system controller 103 temporarily stores the image data transferred from the scanner controller 116 in the work memory 107 and the sub controller 104 executes predetermined image processing and image compression on the image data. The image data is then stored in an image region of the flash memory 105. Subsequently, the system controller 103 communicates with the printer unit 102 via the command bus. In synchronization with the operation of the printer unit 102, the system controller 103 reads out the compressed image data to the work memory 107 from the flash memory 105, and writes back the image data onto the work memory 107 after the sub controller 104 executes decompression processing. After that, the system controller 103 transfers the image data to the printer controller 117 of the printer unit 102 from the work memory 107. The printer controller 117 of the printer unit 102 converts the image data transferred from the control unit 100 into a record signal and transmits the converted image data to the printer engine 118, which stores that image data in a storage medium.

In addition, the power supply unit 112 supplies the all-night power supply to a part of the system controller 103 (i.e., an all-night power supply block (not illustrated) including an I/F unit for receiving a return signal from the printer controller 117), a part of the operation unit 106 including a power saving key (not illustrated), the external I/F unit 108, the work memory 107, and below-described individual components illustrated in FIG. 4 such as a front door switch 401, a resistor 402, a sensor 406, and a resistor 407.

Figure 2:
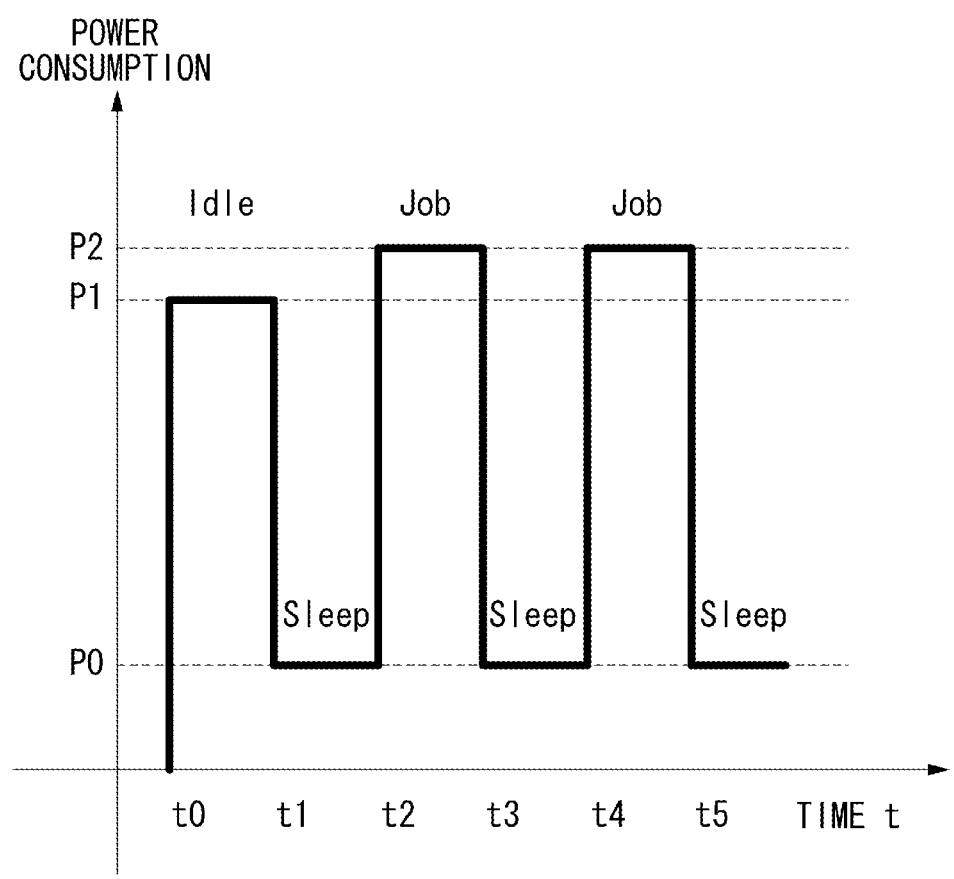
FIG. 2 is a graph illustrating transition of the power state of the image forming apparatus according to the exemplary embodiment.

Next, an operation for controlling the power state of the MFP 119 will be described. FIG. 2 is a graph illustrating transition of the power state of the MFP 119 in a time-sequential manner starting from the power-on state. First, at time t0, when the power is supplied to the MFP 119, predetermined initial settings and activation sequence are executed so that the MFP 119 is activated to enter an idle mode (stand-by state). In the idle mode, the all-night power supply and the non all-night power supply are supplied from the power supply unit 112 of the control unit 100. In this mode, the power consumption level is "P1."

Then, the idle mode is continued for a predetermined period of time, and at time t1, the MFP 119 executes power saving control and shifts to a sleep mode (sleep state). More specifically, the system controller 103 executes sleep shifting processing such as data saving processing and turns off the power from the non all-night power supply of the power supply unit 112. The power consumption level of the MFP 119 in the sleep mode is "P0".

Once the MFP 119 has entered the sleep mode, the sleep mode is maintained until a new job request is received. When the MFP 119 receives a job request at time t2, the MFP 119 exits from the sleep mode and shifts to a job execution mode (job execution state) in order to execute job processing. The power consumption level in the job execution mode is "P2," which is slightly higher than the power consumption level "P1" in the idle mode.

When the job processing has been completed at time t3, the MFP 119 shifts to the sleep mode again. Then, when the MFP 119 again receives a new job request at time t4, the MFP 119 returns from the sleep mode and shifts to the job execution mode. In the same way, the MFP 119 shifts to the sleep state at time t5, and repeats the transition between the sleep wake-up and a normal operation mode.

There is a plurality of return factors for causing the MFP 119 to return from the sleep state. FIG. 3 is a table illustrating example return factors of the MFP 119. As illustrated in a row 301, a factor 1 corresponds to a case where the user presses a power saving key (not illustrated) provided on the operation unit 106 to make the MFP 119 return in order to use the MFP 119. In the MFP 119, the operation unit 106 transmits to the system controller 103 a detection signal that is indicative of the pressing of the power saving key. Upon receipt of the detection signal notifying that the power saving key has been operated, the system controller 103 shifts the MFP 119 to the normal power state from the sleep state by prompting the power supply unit 112 to turn on the non all-night power supply.

A factor 2 is illustrated in a row 302 in a case where data to be printed by the MFP 119 is transmitted from an external device such as a personal computer (PC). In this case, the external I/F unit 108 receives a specific packet (in case of the LAN, receives a Wake-On-LAN (WOL) packet) on the network such as the LAN and then analyzes the packet. In a case where the external I/F determines that the received packet is a specific packet for recovering of the MFP 119, the external I/F unit 108 notifies the system controller 103 of the receipt of the specific packet by transmitting a detection signal. Upon receipt of the detection signal, the system controller 103 prompts the power supply unit 112 to turn on the non all-night power supply, which recovers the MFP 119 from the sleep mode to the normal power state.

A factor 3 is illustrated in a row 303 in a case where the user places a recording sheet on a manual sheet feeding tray to execute a print job through the MFP 119. A factor 4 is illustrated in a row 304 in a case where the user or a service engineer opens a door provided on the printer unit 102 to perform maintenance work of the MFP 119.

The return factors of the MFP 119 are not limited to the above-described factors 1 to 4, and other factors may be added according to the optional configuration of the product. In such a case, if the system controller 103 is configured to receive a detection signal from each unit corresponding to each factor such as the factor 1 or 2 one-to-one, the number of received detection signals is increased. Therefore, in the MFP 119, with respect to the return factors 3 and 4, if any of the above two return factors arises in the printer unit 102, the printer unit 102 notifies the system controller 103 of the return factor by transmitting a return signal as a detection signal. Naturally, the system controller 103 may be also notified of the occurrence of the return factor 1 and 2 by receiving a single detection signal in which the return factors are aggregated.

A method for notifying two return factors by using a single return signal will be described below. FIG. 4 is a block diagram illustrating a configuration for aggregating return factors into a single return signal by the printer controller 117 of the printer unit 102.

A CPU 400 controls an operation of the printer unit 102. A front door switch 401 is disposed on a front door which is opened by a service engineer or a user in order to access the internal portions of the printer unit 102. A resistor 402 is disposed in order to supply all-night power supply to the front door switch 401. A low-pass filter 403 is disposed in order to eliminate chattering occurring at the time when the front door switch 401 is pressed.

An output of the low-pass filter 403 is "L" when the front door switch 401 is open, and a switch circuit 404 is turned off accordingly. An output of the low-pass filter 403 is "H" when the front door switch 401 is closed, and the switch circuit 404 is turned on accordingly. The output of the switch circuit 404 is pulled up to the non all-night power supply by the resistor 405 and input to the CPU 400. Accordingly, when the power is turned on, the CPU 400 detects "H" as an input from the switch circuit 404 if the front door is open, while detecting "L" if the front door is closed.

A photo-sensor 406 detects presence or absence of a sheet placed on the manual sheet feeding tray (not illustrated) of the printer unit 102. A resistor 407 is disposed in order to supply the all-night power supply to the photo-sensor 406. A low-pass filter 408 is disposed in order to eliminate chattering occurring at the time when the user places a sheet on the manual sheet feeding tray. A buffer 409 buffers the output of the low-pass filter 408 and inputs to the CPU 400. The buffer 409 is driven by the non all-night power supply whereas the signal input thereto is controlled by the all-night power supply. Accordingly, a single-supply buffer may desirably be used as the buffer 409. When the power is turned on, the CPU 400 detects "L" as an input from the buffer 409 if the sheet is placed on the manual sheet feeding tray (i.e., the sheet is present on the manual sheet feeding tray), while detecting "H" if the sheet is absent.

Further, inversion signals of the outputs of the low-pass filters 403 and 408 are input to a logical add (OR) circuit 410. In a case where at least any one of the inversion signals from the low-pass filters 403 and 408 is "H" (i.e., either the front door is open or the sheet is present on the manual sheet feeding tray), the OR circuit 410 outputs a return signal (return notification) to the system controller 103. Then, the system controller 103 executes return processing upon receiving the return signal.

Figure 5:
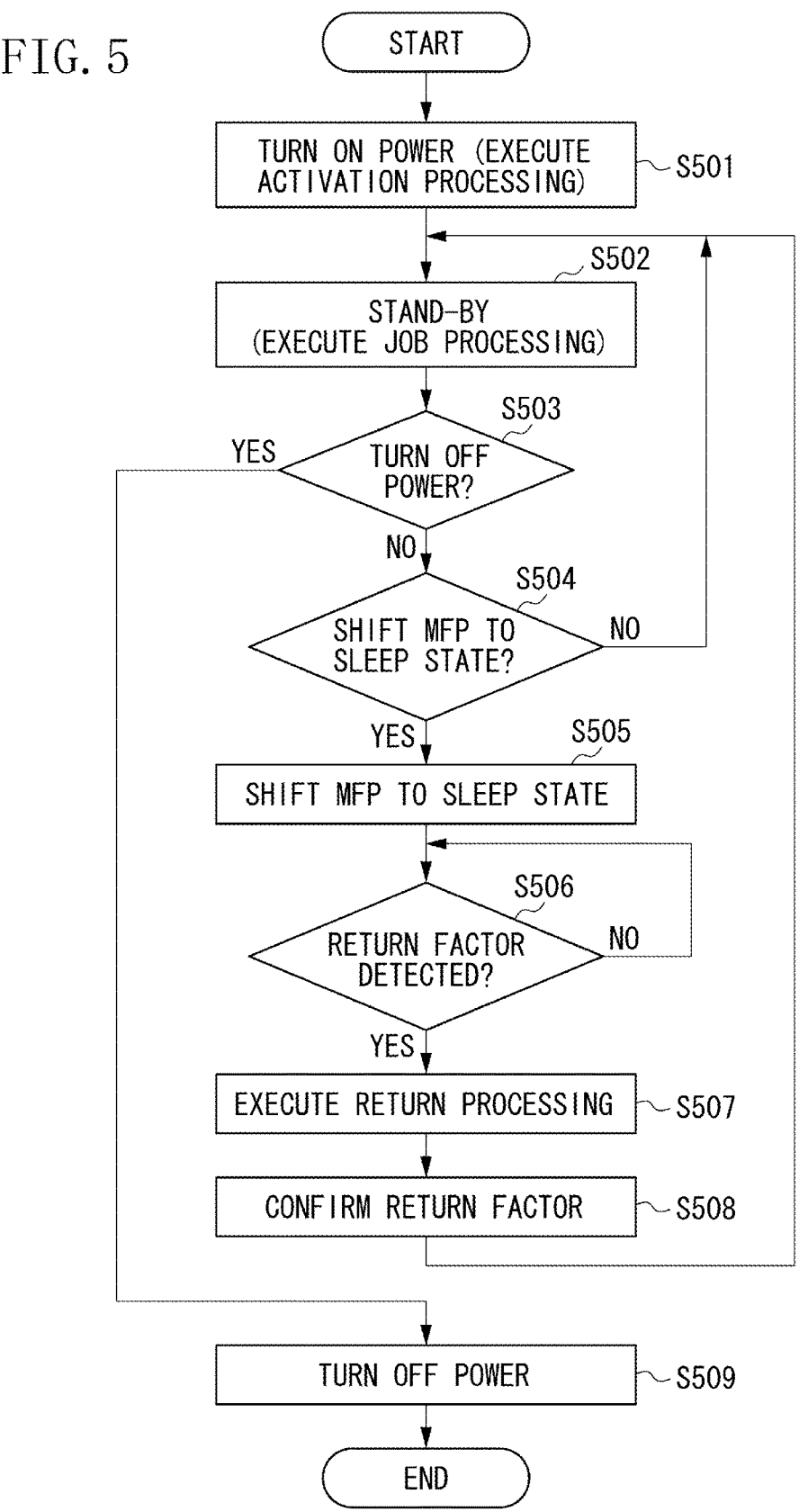
FIG. 5 is a flowchart illustrating a power control sequence of the image forming apparatus according to the exemplary embodiment.

Processing for controlling detection of the return factor at the time of recovery will be described with reference to FIG. 5. FIG. 5 is a flowchart illustrating a sequence of power supply control of the MFP 119. The processing illustrated in the flowchart is realized when the system controller 103 reads and executes a program stored in the flash memory 105.

When the power is supplied to the power supply unit 112 of the MFP 119, the system controller 103 executes activation processing in step S501. After the activation processing is completed, the MFP 119 enters the stand-by state in step S502.

In step S502, when the MFP 119 receives a job request in the stand-by state, the system controller 103 receives the job request and executes processing according to an instruction. In a case where the MFP 119 does not receive a job request, the system controller 103 is ready for receiving an instruction for changing the power state of the MFP 119, and the processing proceeds to step S503.

In step S503, the system controller 103 determines whether a power-off request such as a request for turning off the main SW 111 or a request for remote shut-off has been issued. In a case where the system controller 103 determines that the power-off request has been issued (YES in step S503), the processing proceeds to step S509. In step S509, the system controller 103 executes power-off processing of the system to turn off the power supplied from the power supply unit 112.

On the other hand, in a case where the system controller 103 determines that any power-off request has not been issued (NO in step S503), the processing proceeds to step S504. In step S504, the system controller 103 determines whether to shift the MFP 119 to the sleep state. In a case where a predetermined time period has not passed since the MFP 119 has entered the stand-by state after having completed the last job, the system controller 103 determines not to shift the MFP 119 to the sleep state (NO in step S504), and the processing returns to step S502. In step S502, the system controller 103 re-executes job processing or rechecks the presence of instructions for changing the power state.

On the other hand, in a case where the job request is not input to the MFP 119 for the predetermined time period since the MFP 119 has shifted to the stand-by state, the system controller 103 determines to shift the MFP 119 to the sleep state (YES in step S504), then the processing proceeds to step S505.

In step S505, the system controller 103 executes the sleep shifting processing to shift the MFP 119 to the sleep state. More specifically, the system controller 103 backs up the state of the work memory 107, for example, by the all-night power supply and controls the power supply unit 112 so as to turn off the non all-night power supply.

Next, in step S506, an all-night power supply block of the system controller 103 determines whether a return request has been issued. Then, in a case where the return request has not been issued (i.e., the return signal has not been received) (NO in step S506), the all-night power supply block of the system controller 103 again determines whether the return request has been issued in step S506.

On the other hand, in a case where the return request has been issued (i.e., the return signal has been received) (YES in step S506), the system controller 103 advances the processing to step S507. In step S507, the system controller 103 executes the return processing. More specifically, the system controller 103 controls the power supply unit 112 so as to restart the non all-night power supply, and restores the content of work memory 107 backed up at the time of executing the sleep shifting processing. Further, when the printer controller 117 returns to the normal power state by receiving the non all-night power supply, the printer controller 117 checks the output level of the switch circuit 404 and the output level of the buffer 409 at the time of receiving the non all-night power supply. Thereafter, the processing proceeds to step S508.

In step S508, the system controller 103 confirms the return factor. More specifically, as described in the present exemplary embodiment, in a case where the MFP 119 has returned from the sleep state in response to the return factor from the printer unit 102, the system controller 103 and the printer controller 117 communicate with each other by using a command signal at this timing. Based on the content checked in step S507, the CPU 400 within the printer controller 117 determines whether the return factor has come from the front door switch 401 or the photo-sensor 406, and notifies a result to the system controller 103. Based on the result notified from the printer controller 117, the system controller 103 confirms the return factor and executes the subsequent processing.

For example, the system controller 103 displays a message for notifying that the front door is open on the operation unit 106 in a case where the return factor has derived from opening of the front door. Further, in a case where the return factor has derived from placement of a sheet on the manual sheet feeding tray, the system controller 103 identifies a size of the sheet placed on the manual sheet feeding tray and retains the information as internal information. When the system controller 103 has confirmed the return factor, the processing proceeds to step S502. In step S502, the system controller 103 shifts the MFP 119 to the stand-by state.

As described above, although the only one return signal is transmitted from the printer unit 102 to the control unit 100, the CPUs of individual units can communicate with each other to identify the return factor after the image forming apparatus 119 has returned from the sleep state, and thus the number of return factor signals can be reduced as many as possible. In addition, the image forming apparatus 119 can return from the sleep state when the user simply opens the front door or places a sheet on the manual sheet feeding tray. Accordingly, a user operation for making the image forming apparatus 119 return from the sleep state (e.g., pressing a power saving key) can be eliminated, and thus the working environment of the user can be further improved. Furthermore, by employing the above-described configuration, it is possible to configure an interface common to multiple products with different specifications. For example, even in other type of apparatus, a plurality of return factors from a unit such as a printer unit can be aggregated and notified to a system controller by employing a configuration similar to the above, and the system controller can acquire the information relating to the return factor by communicating with a CPU of the printer unit after returning from the sleep state. Accordingly, it is possible to reduce the cost by employing the above-described configuration in a plurality of products.

Further, in the above-described exemplary embodiment, a configuration in which the image forming apparatus 119 returns from the sleep state in response to a return factor originating from the printer unit 102 has been described. The similar configuration is also applicable to the case where the return factor has originated from the scanner unit 101. For example, the scanner unit 101 includes an automatic document feeder (ADF) for feeding single sheets sequentially from a bundle of documents placed on a document feeding tray of the ADF such that the scanner unit 101 scans image data. Further, a bottom face of the ADF functions as a pressing plate for pressing the document against a document positioning plate (platen glass), and the ADF is configured to be capable of opening-closing with respect to the document positioning plate. The user opens the ADF to place a document when the user scans the document by placing the document on the document positioning plate. Further, the ADF includes an openable-closable cover which forms a sheet feeding path of the ADF, so that the user can remove a document jammed in the sheet feeding path or perform maintenance work of the ADF by opening the cover to expose the sheet feeding path of the ADF.

Further, the scanner unit 101 includes a document detection sensor (e.g., a sensor similar to the photo-sensor 406) for detecting the presence of a document on the document feeding tray of the ADF and a pressing plate detection sensor (e.g., either a sensor similar to the photo-sensor 406 or a switch similar to the front door switch 401) for detecting the open state of the ADF (pressing plate). The scanner unit 101 further includes a cover detection sensor (e.g., either a sensor similar to the photo-sensor 406 or a switch similar to the front door switch 401) for detecting the open state of the openable-closable cover of the ADF.

Figure 4:
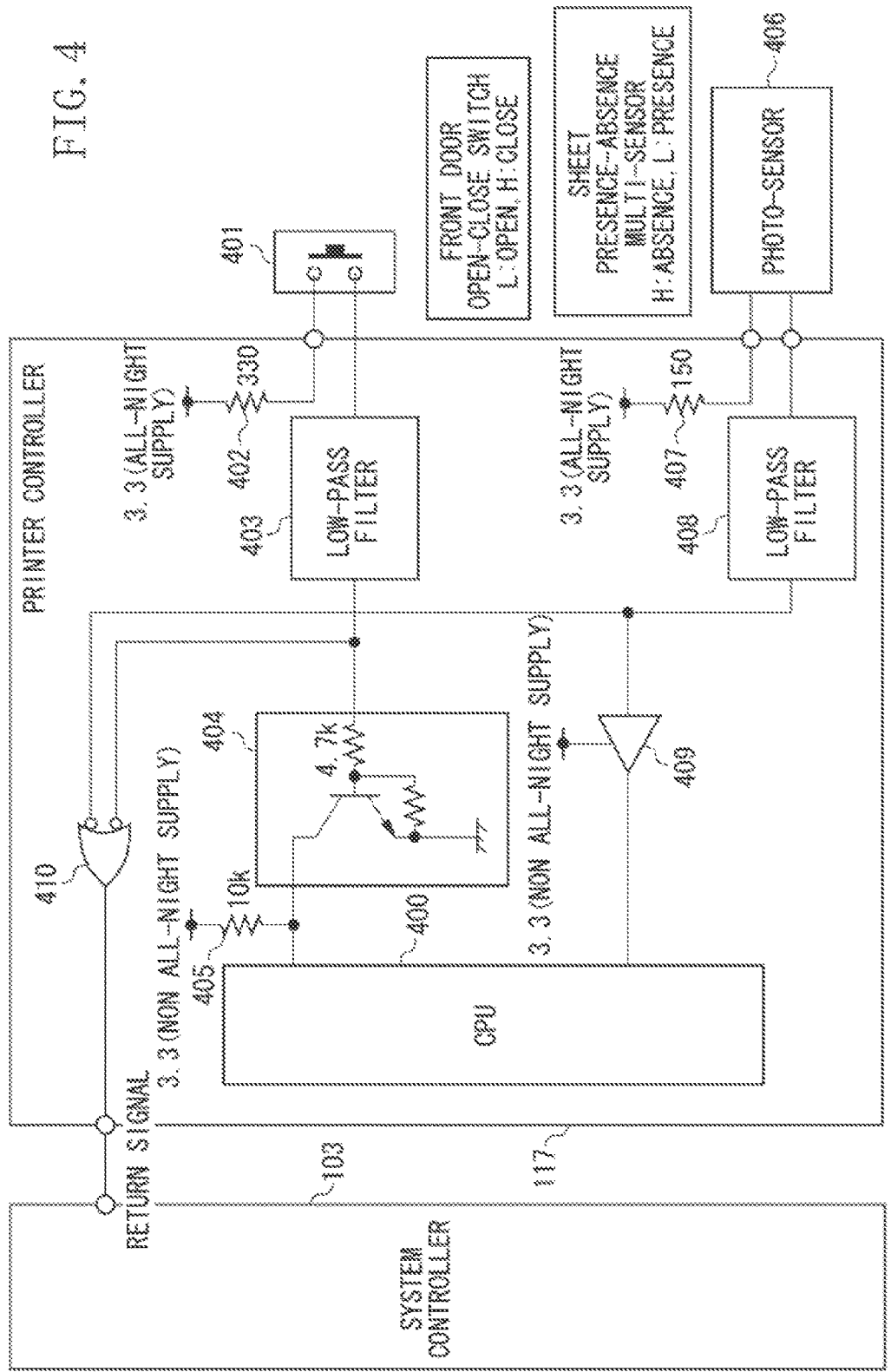
FIG. 4 is a block diagram illustrating a return factor signal generation unit included in a printer unit.

Furthermore, the scanner controller 116 includes a configuration similar to that of the printer controller 117 illustrated in FIG. 4, so that the scanner controller 116 notifies the system controller 103 of a return signal in which the return factors are aggregated in a case where at least any of the following return factors such as the detection by the document detection sensor, of the presence of a document on the document tray, the detection by the pressing plate detection sensor, of an open state of the ADF (pressing plate), and the detection by the cover detection sensor, of an open state of the cover of the ADF detected has occurred in the scanner unit 101. Further, the scanner controller 116 retains the return factors through a configuration similar to that of the switch circuit 404 or the buffer 409 illustrated in FIG. 4. Therefore, after the MFP 119 has returned from the sleep state, a CPU within the scanner controller 116 can acquire the information about the return factor which has made the image forming apparatus 119 return from the sleep state. Further, although the operation of the system controller 103 has been described as illustrated in FIG. 5, in a case where the system controller 103 receives a return signal from the scanner unit 101 in step S506, the system controller 103 communicates with the CPU of the scanner controller 116 to acquire the return factor in step S508.

Further, the image forming apparatus 119 includes operation modes such as a user mode for allowing a user to use the image forming apparatus 119 and a service mode for allowing a service engineer to perform maintenance work. In the user mode, the system controller 103 enables the return factor by placing priority on operability, whereas in the service mode, the system controller 103 disables the return factor by placing priority on power saving. For example, switches such as field-effect transistors (FETs) may be disposed on between the resistor 402 and the all-night power supply and between the resistor 407 and the all-night power supply in FIG. 4, so that the switches are turned on in the user mode while being turned off in the service mode. With the above-described configuration, either operability or power saving can be automatically prioritized according to the operation mode, and thus the convenience of the user can be further improved.

Further, there may be a case in which the image forming apparatus 119 returns from the sleep state immediately after shifting to the sleep state because a sheet has been inadvertently left on the manual sheet feeding tray prior to entering the sleep state. In such a case, the image forming apparatus 119 is configured so as not to return from the sleep state by detecting the presence of one sheet on the manual sheet feeding tray until the image forming apparatus 119 newly detects the presence of a sheet on the manual sheet feeding tray after detecting the absence of a sheet on the manual sheet feeding tray. For example, a logic circuit may be disposed between the low-pass filter 408 and the OR circuit 410, and "H" is input to the OR circuit 410 at the falling edge of the output signal of the low-pass filter 408. By employing the above-described logic circuit, even in a case where a sheet has been left on the manual sheet feeding tray, the image forming apparatus 119 can be prevented from returning from the sleep state upon the detection of a sheet being present on the manual sheet feeding tray until the photo-sensor 406 newly detects the presence of a sheet (i.e., until the falling edge arises in the output signal) after detecting the absence of a sheet once. With the above-described configuration, the image forming apparatus 119 can be prevented from immediately returning from the sleep state because of a sheet left on the manual sheet feeding tray.

As described above, the return factor originating from main units, such as the printer unit 102 or the scanner unit 101, are aggregated by each main unit and notified to the system controller 103. At this time, a signal serving as the return factor is latched by the main unit, so that the main unit notifies the system controller 103 of the return factor by referring to the latched signal after the system controller 103 and software of the main unit return to a state capable of communicating with each other. With the above-described configuration, the number of signals transmitted through the interface between the main unit engine of the image forming apparatus 119 (e.g., the printer unit 102 or the scanner unit 101) and the system controller 103 can be reduced as many as possible while realizing a comfortable operational environment in which the user is less likely to be aware that the image forming apparatus 119 has returned from the sleep state. Further, a user operation can be eliminated by one step when the image forming apparatus 119 returns from the sleep mode, and thus the working environment of the user can be further improved. Furthermore, commonality of the interface for notifying the return factor employed in the apparatuses in different product specifications can be achieved, so that the cost can be further reduced. Accordingly, the number of signals transmitted through the interface between the main unit of the image forming apparatus 119 and the controller can be reduced as many as possible while realizing a comfortable operational environment in which the user is less likely to be aware that the image forming apparatus 119 has returned from the power saving state.

Further, the configuration and the content of the above-described various types of data are not limited to the above, and thus the configuration and the content thereof may be configured in various ways according to the use or the purpose. While the exemplary embodiment has been described as the above, various exemplary embodiments can be also realized with, for example, a system, an apparatus, a method, a program, or a storage medium. Specifically, the exemplary embodiment is applicable to a system configured of a plurality of devices, or an apparatus configured of a single device. Further, any configuration in which the above-described exemplary embodiments are combined with each other is also applicable.

Other Embodiment

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-047164 filed Mar. 11, 2014, which is hereby incorporated by reference herein in its entirety.

What is claimed is:

1. An image forming apparatus comprising:
a plurality of detectors;
a signal output circuit which inputs, from each of the plurality of detectors coupled to the signal output circuit, a plurality of input signals and outputs an output signal via a signal line in accordance with receiving at least one input signal of the plurality of input signals;
a holding circuit which outputs an identification signal indicating the detector which has output the at least one input signal;
a first controller;
a second controller which communicates with the first controller via a command bus different from the signal line; and
a power supply unit which supplies first power supply and second power supply,
wherein the first controller performs, in accordance with receiving the output signal via the signal line, a sleep return processing so that the power supply unit supplies second power supply to the first controller to which second power supply has been stopped and supplies second power supply to the second controller to which second power supply has been stopped,
wherein, on a basis that second power supply is supplied to the second controller from the power supply unit, the second controller checks the identification signal output from the holding circuit, and then transmits, to the first controller via the command bus, information indicating the detector which has output the at least one input signal, and
wherein the first controller performs a process in accordance with the information transmitted from the second controller.

2. The image forming apparatus according to claim 1, wherein the output signal is an interrupt signal.

3. The image forming apparatus according to claim 1, wherein, after the first controller performs the sleep return processing, the first controller acquires, from the second controller via the command bus, the information indicating the detector which has output the at least one input signal.

4. The image forming apparatus according to claim 1 further comprising an image forming unit configured to form an image on a sheet,
wherein the plurality of detectors includes a door switch which detects opening or closing of a door disposed on the image forming apparatus and a paper sensor which detects a sheet, to be fed to the image forming unit, on a manual sheet feeding tray.

5. The image forming apparatus according to claim 1, further comprising a reader which reads image data from a document placed on a document positioning plate or a document fed from a document tray,
wherein the plurality of detectors includes at least one of a first detector which detects opening of a pressing plate that presses the document against the document positioning plate and a second detector which detects a sheet on the document tray.

6. The image forming apparatus according to claim 1, further comprising a printer which prints an image on a sheet,
wherein the second controller controls the printer.

7. The image forming apparatus according to claim 1, wherein the first power supply is all-night power supply and the second power supply is non all-night power supply.

8. A control method of an image forming apparatus having a plurality of detectors, a signal output circuit coupled to the plurality of detectors, a holding circuit, a first controller, a second controller which communicates with the first controller via a command bus different from a signal line, and a power supply unit which supplies first power supply and second power supply, the control method comprising:
inputting, via the signal output circuit and from each of the plurality of detectors coupled to the signal output circuit, a plurality of input signals and outputting an output signal via the signal line in accordance with receiving at least one input signal of the plurality of input signals;
outputting, via the holding circuit, an identification signal indicating the detector which has output the at least one input signal;
performing, via the first controller and in accordance with receiving the output signal via the signal line, a sleep return processing so that the power supply unit supplies second power supply to the first controller to which second power supply has been stopped and supplies second power supply to the second controller to which second power supply has been stopped;
on a basis that second power supply is supplied to the second controller from the power supply unit, checking, via the second controller, the identification signal output from the holding circuit, and then transmitting, via the second controller to the first controller via the command bus, information indicating the detector which has output the at least one input signal; and
performing, via the first controller, a process in accordance with the information transmitted from the second controller.

9. The control method according to claim 8, wherein the output signal is an interrupt signal.

10. The control method according to claim 8, wherein, after the first controller performs the sleep return processing, the first controller acquires, from the second controller via the command bus, the information indicating the detector which has output the at least one input signal.

11. The control method according to claim 8 further comprising forming an image on a sheet via an image forming unit,
wherein the plurality of detectors includes a door switch which detects opening or closing of a door disposed on the image forming apparatus and a paper sensor which detects a sheet, to be fed to the image forming unit, on a manual sheet feeding tray.

12. The control method according to claim 8, further comprising reading, via a reader, image data from a document placed on a document positioning plate or a document fed from a document tray,
wherein the plurality of detectors includes at least one of a first detector which detects opening of a pressing plate that presses the document against the document positioning plate and a second detector which detects a sheet on the document tray.

13. The control method according to claim 8, further comprising printing an image on a sheet via a printer,
wherein the second controller controls the printer.

14. The control method according to claim 8, wherein the first power supply is all-night power supply and the second power supply is non all-night power supply.

15. A non-transitory computer readable storage medium storing computer executable instructions to cause a computer to execute a control method of an image forming apparatus having a plurality of detectors, a signal output circuit coupled to the plurality of detectors, a holding circuit, a first controller, a second controller which communicates with the first controller via a command bus different from a signal line, and a power supply unit which supplies first power supply and second power supply, the control method comprising:
inputting, via the signal output circuit and from each of the plurality of detectors coupled to the signal output circuit, a plurality of input signals and outputting an output signal via the signal line in accordance with receiving at least one input signal of the plurality of input signals;
outputting, via the holding circuit, an identification signal indicating the detector which has output the at least one input signal;
performing, via the first controller and in accordance with receiving the output signal via the signal line, a sleep return processing so that the power supply unit supplies second power supply to the first controller to which second power supply has been stopped and supplies second power supply to the second controller to which second power supply has been stopped;
on a basis that second power supply is supplied to the second controller from the power supply unit, checking, via the second controller, the identification signal output from the holding circuit, and then transmitting, via the second controller to the first controller via the command bus, information indicating the detector which has output the at least one input signal; and
performing, via the first controller, a process in accordance with the information transmitted from the second controller.

16. The non-transitory computer readable storage medium according to claim 15, wherein the output signal is an interrupt signal.

17. The non-transitory computer readable storage medium according to claim 15, wherein, after the first controller performs the sleep return processing, the first controller acquires, from the second controller via the command bus, the information indicating the detector which has output the at least one input signal.

18. The non-transitory computer readable storage medium according to claim 15, the control method further comprising forming an image on a sheet via an image forming unit,
    wherein the plurality of detectors includes a door switch which detects opening or closing of a door disposed on the image forming apparatus and a paper sensor which detects a sheet, to be fed to the image forming unit, on a manual sheet feeding tray.

19. The non-transitory computer readable storage medium according to claim 15, the control method further comprising reading, via a reader, image data from a document placed on a document positioning plate or a document fed from a document tray,
    wherein the plurality of detectors includes at least one of a first detector which detects opening of a pressing plate that presses the document against the document positioning plate and a second detector which detects a sheet on the document tray.

20. The non-transitory computer readable storage medium according to claim 15, the control method further comprising printing an image on a sheet via a printer,
    wherein the second controller controls the printer, and
    wherein the first power supply is all-night power supply and the second power supply is non all-night power supply.

* * * * *